US012630189B2

(12) United States Patent (10) Patent No.: US 12,630,189 B2
Gyllenhammar et al. (45) Date of Patent: May 19, 2026

(54) METHODS AND APPARATUSES FOR CLOSED-LOOP EVALUATION FOR AUTONOMOUS VEHICLES

(71) Applicant: ZENSEACT AB, Gothenburg (SE)

(72) Inventors: Magnus Gyllenhammar, Pixbo (SE); Carl Zandén, Lindome (SE); Majid Khorsand Vakilzadeh, Mölndal (SE)

(73) Assignee: ZENSEACT AB, Gothenburg (SE)

( * ) Notice: Subject to any disclaimer, the term of this patent is extended or adjusted under 35 U.S.C. 154(b) by 228 days.

(21) Appl. No.: 18/495,723

(22) Filed: Oct. 26, 2023

(65) Prior Publication Data

US 2024/0140486 A1 May 2, 2024

(30) Foreign Application Priority Data

Oct. 28, 2022 (EP) ..................................... 22204463

(51) Int. Cl.
*B60W 60/00* (2020.01)
(52) U.S. Cl.
CPC ............................... *B60W 60/0015* (2020.02)
(58) Field of Classification Search
CPC .......... B60W 60/0015; B60W 60/0011; G01C 21/3407; G01C 25/00; G06F 11/3692; G06F 11/3684; G06F 11/3688; G06F 11/3676
See application file for complete search history.

(56) References Cited

U.S. PATENT DOCUMENTS

| | | | |
|---|---|---|---|
| 2007/0106465 A1* | 5/2007 | Adam | G08G 1/00 701/533 |
| 2019/0049257 A1* | 2/2019 | Westover | G05D 1/0276 |
| 2021/0046923 A1 | 2/2021 | Olson et al. | |
| 2021/0235232 A1 | 7/2021 | Redzic et al. | |
| 2022/0128370 A1* | 4/2022 | Srinivasan | G08G 1/096866 |

(Continued)

OTHER PUBLICATIONS

Bernhard, Johannes et al.; "Optimizing test-set diversity: Trajectory clustering for scenario-based testing of automated driving systems"; 2021 IEEE Intelligent Transportation Systems Conference (ITSC); Indianapolis, Indiana, USA; Sep. 19-21, 2021; pp. 1371-1378 (8 pages); XP033993887.

(Continued)

*Primary Examiner* — Joan T Goodbody
*Assistant Examiner* — Godfrey Aleksander Maciorowski
(74) *Attorney, Agent, or Firm* — Sage Patent Group

(57) ABSTRACT
A method for closed-loop evaluation of path planning modules for a vehicle equipped with an Automated Driving System (ADS) is disclosed. The method includes obtaining a candidate path from each of a plurality of path planning modules of the ADS. The method further includes determining a fulfilment of convergence criteria by the obtained candidate paths by comparing the obtained candidate paths with each other and determining a level of convergence between the candidate paths. If the convergence criteria is fulfilled, one of the obtained candidate paths is selected and the vehicle is controlled so to execute the selected candidate path. If the convergence criteria is not fulfilled, determining an exposure need of each path planning module in view of a predicted scene or scenario in the surrounding environment of the vehicle that the vehicle is expected to be exposed to while executing any one of the obtained candidate paths.

14 Claims, 5 Drawing Sheets

(56) References Cited

U.S. PATENT DOCUMENTS

| | | |
|---|---|---|
| 2022/0169278 A1 | 6/2022 | Refaat et al. |
| 2022/0204041 A1 | 6/2022 | Oh |

OTHER PUBLICATIONS

Extended European Search Report mailed Apr. 4, 2023 for European Application No. 22204463.8, 8 pages.
Intention to Grant mailed Feb. 20, 2025 for European Patent Application No. 22204463.8, 43 pages.
Papadakis, Mike et al.; "An Effective Path Selection Strategy for Mutation Testing"; 2009 16th Asia-Pacific Software Engineering Conference; Batu Ferringhi, Malaysia; pp. 422-429 (8 pages).
Wu, You et al.; "An Aircraft Trajectory Prediction Method Based on Trajectory Clustering and a Spatiotemporal Feature Network"; Electronics 2022, 11, 3453; 19 pages.

* cited by examiner

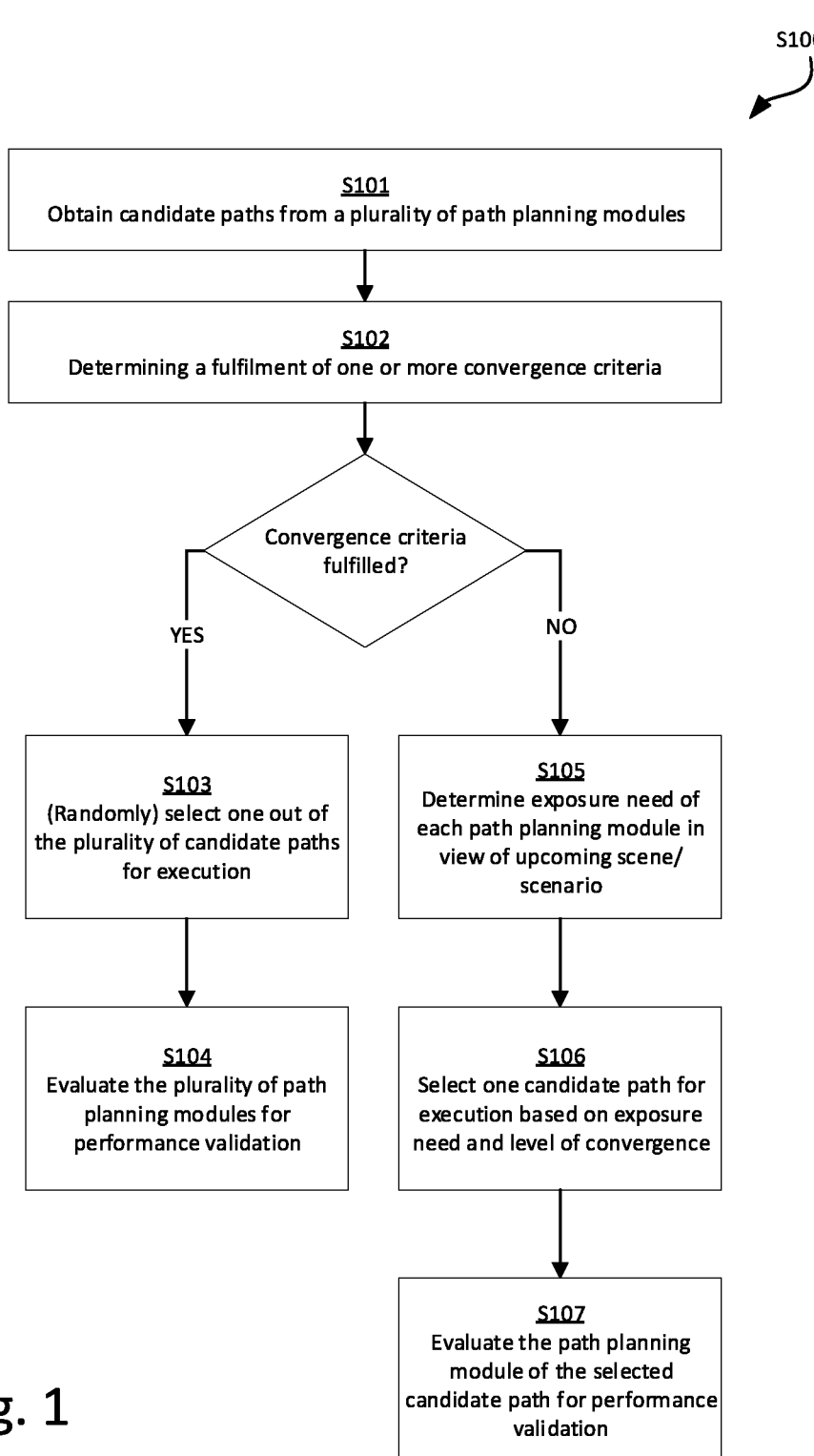

S100

S101
Obtain candidate paths from a plurality of path planning modules

S102
Determining a fulfilment of one or more convergence criteria

Convergence criteria
fulfilled?

YES

NO

S103
(Randomly) select one out of the plurality of candidate paths for execution

S105
Determine exposure need of each path planning module in view of upcoming scene/ scenario

S104
Evaluate the plurality of path planning modules for performance validation

S106
Select one candidate path for execution based on exposure need and level of convergence

S107
Evaluate the path planning module of the selected candidate path for performance validation

Fig. 1

METHODS AND APPARATUSES FOR CLOSED-LOOP EVALUATION FOR AUTONOMOUS VEHICLES

CROSS-REFERENCE TO RELATED APPLICATIONS

The present application for patent claims priority to European Patent Office Application Ser. No. 22204463.8, entitled "METHODS AND APPARATUSES FOR CLOSED-LOOP EVALUATION FOR AUTONOMOUS VEHICLES" filed on Oct. 28, 2022, assigned to the assignee hereof, and expressly incorporated herein by reference.

TECHNICAL FIELD

The disclosed technology relates to the field of Automated Driving Systems (ADS s) for vehicles, and more specifically to computer-implemented methods and apparatuses for performance evaluation and development of a path planning module of a vehicle equipped with an Automated Driving System (ADS). In particular, but not exclusively the disclosed technology relates to closed-loop evaluation of a set of path planning modules of an ADS-equipped vehicle.

BACKGROUND

During the last few years, the research and development activities related to autonomous vehicles has exploded in number and many different approaches are being explored. An increasing portion of modern vehicles have advanced driver-assistance systems (ADAS) to increase vehicle safety and more generally road safety. ADAS—which for instance may be represented by adaptive cruise control, ACC, collision avoidance system, forward collision warning, etc.—are electronic systems that may aid a vehicle driver while driving. Today, there is ongoing research and development within a number of technical areas associated to both the ADAS and Autonomous Driving (AD) field. ADAS and AD will herein be referred to under the common term Automated Driving System (ADS) corresponding to all of the different levels of automation as for example defined by the SAE J3016 levels (0-5) of driving automation, and in particular for levels 3-5.

In a not too distant future, ADS solutions are expected to have found their way into a majority of the new cars being put on the market. An ADS may be construed as a complex combination of various components that can be defined as systems where perception, decision making, and operation of the vehicle are performed by electronics and machinery instead of a human driver, and as introduction of automation into road traffic. This includes handling of the vehicle, destination, as well as awareness of surroundings. While the automated system has control over the vehicle, it allows the human operator to leave all or at least some responsibilities to the system. An ADS commonly combines a variety of sensors to perceive the vehicle's surroundings, such as e.g. radar, LIDAR, sonar, camera, navigation system e.g. GPS, odometer and/or inertial measurement units (IMUs), upon which advanced control systems may interpret sensory information to identify appropriate navigation paths, as well as obstacles, free-space areas, and/or relevant signage.

There are multitudes of different research reports containing various approaches proposed in order to find and execute such a safe and reliable path, and there is further entire research-fields dedicated to finding the optimal path given a set of different constraints. The analytical approaches focus on finding paths given the predictions and states of objects surrounding the vehicle. There is yet another class of methods to obtain paths for a self-driving vehicle, relying on machine learning or deep neural networks to do the work of picking a suitable path.

Furthermore, much of the current efforts for development of ADS s revolves around safely launching a first system to the market. However, once that is achieved, it will be paramount to improve the system in a safe and efficient manner, both to achieve cost efficiency as well as performance improvements. Generally, there are significant costs associated with the development and verification of safety of the ADS (or of "ADS features"/"ADS functions"), especially related to field tests and the understanding of how the system behaves in traffic.

There is accordingly a need in the art for new solutions for facilitating development, verification and validation of path planning functions for Automated Driving Systems in order to continuously be able to provide safer and more performant systems. In particular there is a need in the art for more efficient solutions for testing and validating path planning functions for Automated Driving Systems that allow for more rapid releases of new and improved path planning functions without compromising on safety. As always, the improvements shall preferably be made without significant impact on the size, power consumption and cost of the on-board system or platform.

SUMMARY

The herein disclosed technology seeks to mitigate, alleviate or eliminate one or more of the above-identified deficiencies and disadvantages in the prior art to address various problems relating to development, verification and validation of path planning functions for Automated Driving Systems (ADSs).

Various aspects and embodiments of the disclosed invention are defined below and in the accompanying independent and dependent claims.

A first aspect of the disclosed technology comprises a computer-implemented method for closed-loop evaluation of path planning modules for a vehicle equipped with an Automated Driving System (ADS). The method comprises obtaining a candidate path from each of a plurality of path planning modules of the ADS, wherein each path planning module is configured to generate candidate paths to be executed by the ADS of the vehicle. The method further comprises determining a fulfilment of one or more convergence criteria by the obtained candidate paths by comparing the obtained candidate paths with each other and determining a level of convergence between the candidate paths. Moreover, in an instance where the obtained candidate paths fulfil the one or more convergence criteria, the method further comprises selecting one of the obtained candidate paths and controlling the vehicle so to execute the selected candidate path, and evaluating each of the plurality of path planning modules based on the executed candidate path. However, in an instance where the obtained candidate paths do not fulfil the one or more convergence criteria. The method further comprises determining an exposure need of each path planning module in view of a predicted scene or scenario in the surrounding environment of the vehicle that the vehicle is expected to be exposed to while executing any one of the obtained candidate paths. Furthermore, the method comprises selecting one candidate path based on the determined exposure need and the determined level of convergence and controlling the vehicle so to execute the selected candidate path, and evaluating the path planning module that generated the selected candidate path based on the executed candidate path.

A second aspect of the disclosed technology comprises a computer program product comprising instructions which, when the program is executed by a computing device, causes the computer to carry out the method according to any one of the embodiments disclosed herein. With this aspect of the disclosed technology, similar advantages and preferred features are present as in the other aspects.

A third aspect of the disclosed technology comprises a (non-transitory) computer-readable storage medium comprising instructions which, when executed by a computing device, causes the computer to carry out the method according to any one of the embodiments disclosed herein. With this aspect of the disclosed technology, similar advantages and preferred features are present as in the other aspects.

The term "non-transitory," as used herein, is intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link. Thus, the term "non-transitory", as used herein, is a limitation of the medium itself (i.e., tangible, not a signal) as opposed to a limitation on data storage persistency (e.g., RAM vs. ROM).

A fourth aspect of the disclosed technology comprises an apparatus for closed-loop evaluation of path planning modules for a vehicle equipped with an Automated Driving System (ADS). The apparatus comprises control circuitry configured to obtain a candidate path from each of a plurality of path planning modules of the ADS, where each path planning module is configured to generate candidate paths to be executed by the ADS of the vehicle. The control circuitry is further configured to determine a fulfilment of the one or more convergence criteria by the obtained candidate paths by comparing the obtained candidate paths with each other and determining a level of convergence between the candidate paths. Then, in an instance where the obtained candidate paths fulfil the one or more convergence criteria, the control circuitry is configured to select one of the obtained candidate paths and controlling the vehicle so to execute the selected candidate path, and evaluate each of the plurality of path planning modules based on the executed candidate path. Further, in an instance where the obtained candidate paths do not fulfil the one or more convergence criteria, the control circuitry is configured to determine an exposure need of each path planning module in view of a predicted scene or scenario in the surrounding environment of the vehicle that the vehicle is expected to be exposed to while executing any one of the obtained candidate paths. The control circuitry is further configured to select one candidate path based on the determined exposure need and the determined level of convergence and controlling the vehicle so to execute the selected candidate path, and evaluate the path planning module that generated the selected candidate path planning modules based on the executed candidate path. With this aspect of the disclosed technology, similar advantages and preferred features are present as in the other aspects.

A fifth aspect of the disclosed technology comprises a vehicle comprising an Automated Driving System, and an apparatus according to any one of the embodiments disclosed herein. With this aspect of the disclosed technology, similar advantages and preferred features are present as in the other aspects.

The disclosed aspects and preferred embodiments may be suitably combined with each other in any manner apparent to anyone of ordinary skill in the art, such that one or more features or embodiments disclosed in relation to one aspect may also be considered to be disclosed in relation to another aspect or embodiment of another aspect.

Further embodiments are defined in the dependent claims. It should be emphasized that the term "comprises/comprising" when used in this specification is taken to specify the presence of stated features, integers, steps, or components. It does not preclude the presence or addition of one or more other features, integers, steps, components, or groups thereof.

An advantage of some embodiments is enablement of more frequent releases of new or updated ADS features or functions, while still fulfilling requirements related to validation and testing.

An advantage of some embodiments is a better optimization of validation and/or test coverage of multiple ADS features or functions under active development or testing.

An advantage of some embodiments is that a better utilization of production resources for furthering new ADS features or functions that require closed loop testing.

An advantage of some embodiments is that the need for a large fleet of dedicated test/development vehicles for ADS feature development, validation, and/or testing is at least partly alleviated.

These and other features and advantages of the disclosed technology will in the following be further clarified with reference to the embodiments described hereinafter.

BRIEF DESCRIPTION OF THE DRAWINGS

The above aspects, features and advantages of the disclosed technology, will be more fully appreciated by reference to the following illustrative and non-limiting detailed description of example embodiments of the present disclosure, when taken in conjunction with the accompanying drawings, in which:

FIG. 1 is a schematic flow chart representation of a method for closed-loop evaluation of path planning modules for a vehicle equipped with an Automated Driving System (ADS) in accordance with some embodiments.

DETAILED DESCRIPTION

Figure 2:
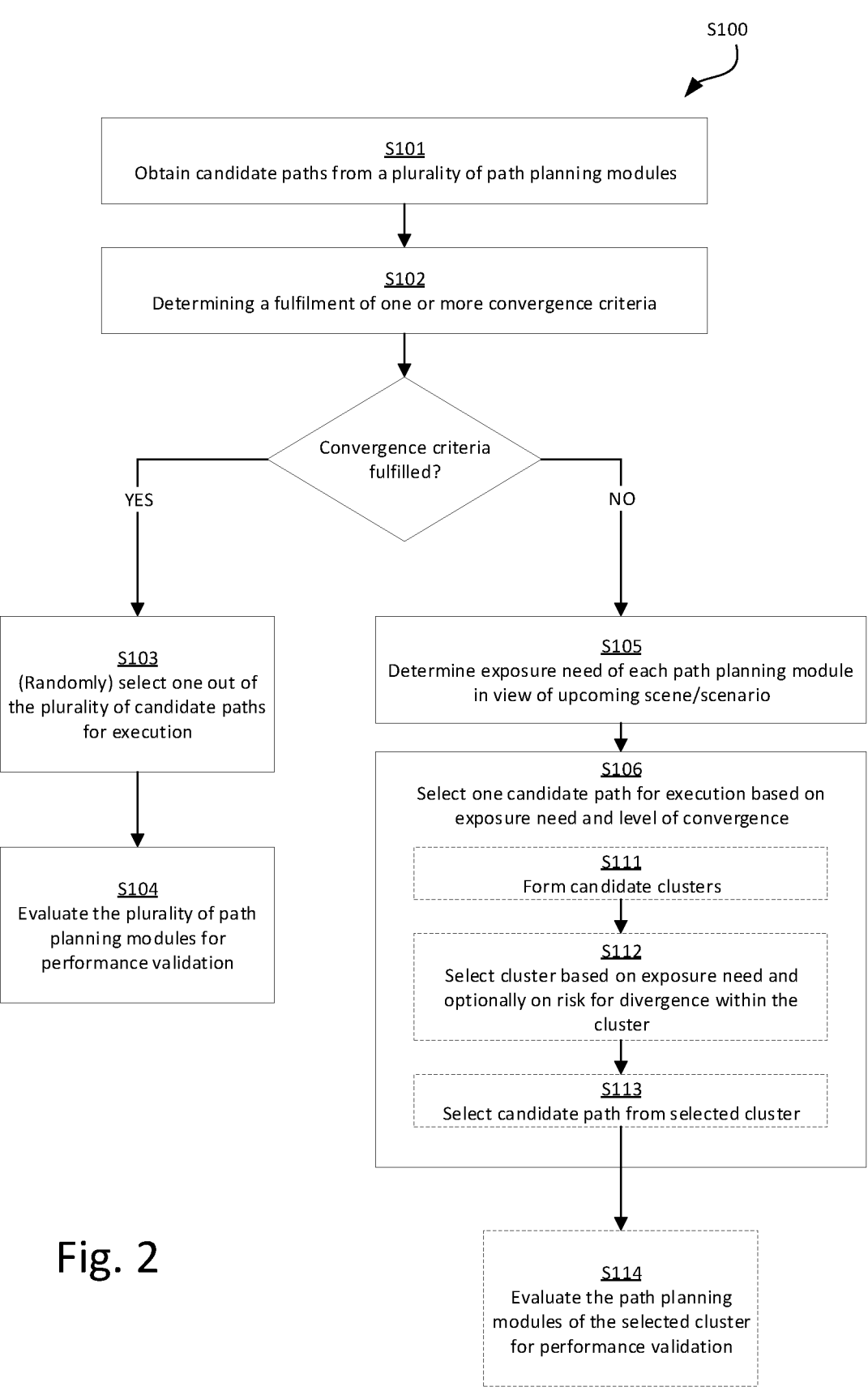
FIG. 2 is a schematic flow chart representation of a method for closed-loop evaluation of path planning modules for a vehicle equipped with an Automated Driving System (ADS) in accordance with some embodiments.

The present disclosure will now be described in detail with reference to the accompanying drawings, in which some example embodiments of the disclosed technology are shown. The disclosed technology may, however, be embodied in other forms and should not be construed as limited to the disclosed example embodiments. The disclosed example embodiments are provided to fully convey the scope of the disclosed technology to the skilled person. Those skilled in the art will appreciate that the steps, services and functions explained herein may be implemented using individual hardware circuitry, using software functioning in conjunction with a programmed microprocessor or general purpose computing device, using one or more Application Specific Integrated Circuits (ASICs), using one or more Field Programmable Gate Arrays (FPGA) and/or using one or more Digital Signal Processors (DSPs).

It will also be appreciated that when the present disclosure is described in terms of a method, it may also be embodied in an apparatus comprising one or more processors, one or more memories coupled to the one or more processors, where computer code is loaded into the one or more memories to implement the method. For example, the one or more memories may store one or more computer programs that causes a computing device to perform the steps, services and functions disclosed herein when executed by the one or more processors in some embodiments. The one or more processors may be part of an in-vehicle processing device, such as an on-board computer of an ADS-equipped vehicle, in accordance with some embodiments.

It is also to be understood that the terminology used herein is for purpose of describing particular embodiments only, and is not intended to be limiting. It should be noted that, as used in the specification and the appended claim, the articles "a", "an", "the", and "said" are intended to mean that there are one or more of the elements unless the context clearly dictates otherwise. Thus, for example, reference to "a unit" or "the unit" may refer to more than one unit in some contexts, and the like. Furthermore, the words "comprising", "including", "containing" do not exclude other elements or steps. It should be emphasized that the term "comprises/comprising" when used in this specification is taken to specify the presence of stated features, integers, steps, or components. It does not preclude the presence or addition of one or more other features, integers, steps, components, or groups thereof. The term "and/or" is to be interpreted as meaning "both" as well and each as an alternative. The term "obtaining" is herein to be interpreted broadly and encompasses receiving, retrieving, collecting, acquiring, and so forth.

It will also be understood that, although the term first, second, etc. may be used herein to describe various elements or features, these elements should not be limited by these terms. These terms are only used to distinguish one element from another. For example, a first signal could be termed a second signal, and, similarly, a second signal could be termed a first signal, without departing from the scope of the embodiments. The first signal and the second signal are both signals, but they are not the same signal.

In the development of Automated Driving Systems, there is a general objective or desire that the development of ADS features or functions should adhere to state-of-the-art software development schemes including continuous development, and frequent releases to the end-consumers. However, there is an extensive validation need for ADS features or functions before they can be reliably released as an unsupervised feature to the end-consumers. Accordingly, the aim to get ADS features into the hands of the consumers as frequently as possible is counterweighed by the requirement of extensive in-field testing/validation before such releases.

The herein disclosed technology aims to provide for a solution for advantageously merging these two partly opposing aspects related to the development of ADS features, and in particular for ADS path planning functions (may also be referred to as "path planners", "path planning modules", or "path planning features"), where some embodiments herein provide a solution for testing and validating several ADS path planning functions in parallel in a safe manner. Thus, some embodiments provide the advantage of being able to provide more frequent releases of new or updated ADS path planning functions, while still fulfilling requirements related to validation and testing.

For many geographic areas, there are considerable differences in operational conditions throughout the seasons across the year, thus, to have full validation coverage for a new (or updated) ADS path planning function one would need to run tests for at least a full year. Thus, in order to release new (or updated) ADS path planning functions to the end-consumer one may have to wait a full year for the testing and validation effort after initial development phase.

As opposed to traditional parallel software testing, there is a problem in the field of Automated Driving Systems in that, even though an entire fleet of vehicles (each configured to test a multitude of versions of an ADS feature) would be exposed to all different variations of operating conditions and situations (including seasonal ones), it cannot automatically and simply be assured this is true for each and every version of the ADS feature. One could at least partly mitigate this problem by deploying a random sampling across the fleet of vehicles, specifying which vehicle should run which version of the ADS feature under test, or even consider sampling the version per initiated driving cycle. However, there will still be a remaining risk that the sampling does not yield sufficient coverage across the operating conditions and situations for each and every version of the ADS features.

The solution proposed herein aims to at least partly alleviate this and other problems. In more detail, and in accordance with some embodiments, this is achieved by running a plurality of versions of an ADS path planning feature/module in parallel and monitoring their output. At a point of divergence between the generated paths from the different modules, an "arbitration module/system", which incorporates the analysed "validation coverage" of each feature/module, relates this to the predicted future state operating conditions of the ADS, and then selects the most suitable path planning module(s) for evaluation. Herein, the "validation coverage" is referred to as a "validation heat map" that is used to determine an exposure need.

In short, each candidate path is obtained and the convergence between them is determined. If one or more convergence criteria are not met an arbitration decision is requested before the most suitable (optimal) path is relayed to vehicle control so to make the vehicle execute the path. In this case, the path planner version that generated the selected and executed path is evaluated. However, if the convergence criteria is met, i.e. all of the candidate paths are converging, then an arbitrary/random selection of a candidate path is performed and all of the path planning modules can be evaluated based on the executed candidate path. Thereby, an optimized validation/test coverage of multiple path planning modules under active development and/or testing may be achieved. Moreover, the solution proposed herein can be fully automated, thereby rendering the testing/evaluation of new or updated ADS path planning features more time-efficient and cost-effective.

The accumulation of data for development, evaluation and testing purposes is arguably one of the most cost-intensive parts of realising new/updated ADS path planning functions, and oftentimes dedicated development vehicles (with a specific and oftentimes costly hardware platform) are utilized to accumulate the data. The herein proposed solution enables the utilization of production vehicles (i.e. the regular vehicles sold to the end-consumers) to provide this data, and thereby the need for dedicated development vehicles is at least partly alleviated, which not only provides for significant savings in terms of cost but also in terms of time. Thus, an advantage of some embodiments an enablement of more frequent and cost-effective releases of new and updated ADS path planning features/functions.

FIG. 1 is a schematic flowchart representation of a method S100 for closed-loop evaluation of path planning modules for a vehicle equipped with an Automated Driving System (ADS) in accordance with some embodiments. The path planning modules may be understood as path planning features or path planning functions of the ADS that are configured to generate and output suitable candidate paths to be executed by the vehicle under the control of the ADS. In other words, the path planning modules are configured to generate suitable candidate paths to be executed autonomously by the ADS-equipped vehicle. The path planning modules may accordingly comprise suitable software (algorithms, such as machine-learning algorithms or other conventional path planning algorithms as readily understood by the skilled artisan) configured to output suitable candidate paths based on an input comprising various (processed) sensor data (detected and classified objects, lane geometry, etc.), vehicle state information (position, heading, speed, etc), and so forth. Moreover, in the present context, the closed-loop evaluation of path planning modules may be understood as a specific implementation of closed-loop evaluation of new or updated software versions of the ADS's path planning function.

The method S100 is preferably a computer-implemented method S100, performed by a processing system of the ADS-equipped vehicle. The processing system may for example comprise one or more processors and one or more memories coupled to the one or more processors, wherein the one or more memories store one or more programs that causes the processing system to perform the steps, services and functions of the method S100 disclosed herein when executed by the one or more processors.

The method S100 comprises obtaining S101 a candidate path from each of a plurality of path planning modules of the ADS. Here, each path planning module is configured to generate candidate paths to be executed by the ADS of the vehicle. A path panning module may be understood as a software and/or hardware implemented algorithm configured to output a candidate path suitable for the vehicle to execute by appropriate control of one or more actuators controlling acceleration, braking and steering of the vehicle. The path planning modules may be configured to use map data (e.g. HD Map data), perception data (e.g. processed sensor data in the form of Radar images, LiDAR images, Camera images, etc.), and localization data (e.g. GNSS data) as input to generate the candidate paths. Thus, a candidate path may in the present context be understood as a "suggested" path suitable for execution by the vehicle. The candidate path may for example comprise a set of locations or positions (e.g. specific map coordinates or geographical coordinates) that the vehicle is intended to traverse. The candidate path may extend from a starting point represented by the vehicle's current location/position to a final point represented by a goal location/position. In some embodiments, the candidate paths (only) extend within the ADS's sensor range. It should be noted that a candidate path as used herein may be in the form of a candidate trajectory, which can be understood as a time-dependent candidate path. In some embodiments, the obtained S101 candidate paths have a limited length, expressed either as a spatial length (e.g. 50 m, 100 m, 150 m, etc.) or in time (e.g. 1 s, 2 s, 5 s, etc.). The length of the candidate paths are preferably the same for each of the plurality of candidate paths. Moreover, the obtained S101 candidate paths may differ depending on various factors such as e.g. a speed of the ego-vehicle and/or a scenario (e.g. highway driving, dense urban traffic, traffic jam, etc.), and need therefore not be the same in every sample.

The method S100 further comprises determining S102 a fulfilment of one or more convergence criteria by the obtained candidate paths by comparing the obtained candidate paths with each other and determining a level of convergence between the candidate paths. The one or more convergence criteria may for example comprise one or more of that the compared candidate paths have the same geometrical extension/representation, that the compared candidate paths have a similar geometrical extension/representation (below an error margin threshold), that the compared candidate paths have the same end position/location, and/or that the compared candidate paths have a number/percentage of coinciding discrete locations/positions along the extension of the candidate paths that are above a threshold. In some embodiments, the one or more convergence criteria comprises a criterion that all of the obtained candidate paths converge within an error margin. Thus, the "level of convergence" between the candidate paths may comprise one or more metrics defining how well each candidate path converges with respect to each and every other of the obtained candidate paths.

The one or more metrics may for example comprise a normalized value where 1 indicates complete convergence and 0 indicates no convergence. Accordingly, a convergence criterion may be that the compared candidate paths have convergence value above a predefined threshold, such as e.g. above 0.8, 0.85, 0.9, 0.95, or 0.99. More specifically, "a level of convergence" between two different candidate paths may for example be determined by plotting or otherwise providing a geometrical representation of the two candidate paths in the same reference coordinate space (e.g. a Cartesian coordinate system) and then comparing the two paths with respect to their overlap in the reference coordinate space. Thus, in a situation where the two paths completely overlap (i.e. every point of the two candidate paths coincide in the reference coordinate space) the resulting convergence level of 1,0 if expressed as a normalized value. Similarly, if zero points of the two candidate paths coincide in the reference coordinate space, then the resulting convergence level would be 0 if expressed as a normalized value. However, this is merely one out of several examples, and other rules may be applied for determining a level of convergence between two candidate paths.

For example, one could compare the geometrical extension/representation of two candidate paths. Accordingly, in some embodiments, the geometrical extension/representation of each candidate path is provided as one or more third, or higher, order polynomial equations. For example, each candidate path may be partitioned into segments expressed in the form of a third order polynomial $y_{i,N}=A_{i,N}x^3+B_{i,N}x^2+C_{i,N}x+D_{i,N}$, where i denotes the index of the candidate path (e.g. first, second, third, etc.) and N denotes the index of the segment for that candidate path. Further, A, B, C, and D represent a curvature rate, a curvature, a heading, and a lateral offset from road edge, respectively. Thus, one can compare these factors (A, B, C, D) for corresponding segments of two different candidate paths in order to determine a level of convergence. In some embodiments, the polynomial equations defining each candidate path are compared in order to determine a level of convergence. For example, two candidate paths where the factors A, B, C, and D are identical for each corresponding segment will have a higher level of convergence than two candidate paths where the factors A, B, C, and D differ for one or more corresponding segments.

In a specific example, one could have two candidate paths where the factors A, B, and C are identical for each corresponding segment while the factor D differs by e.g. 5% between the two paths consistently. This means that the two candidate paths have the same curvatures and curvature rates at the same longitudinal positions along the road, but that they are offset laterally from each other. Thus, in this example the two paths may not have any points that overlap in the same reference coordinate system, but may still be deemed to have a level of convergence higher than 0, if expressed as a normalized value, due to the other similarities of the two candidate paths. An exact quantity of the level of convergence in such a scenario will depend on the underlying rules of the algorithm used to determine the level of convergence, and may be modified based on specific realizations and objectives, as readily understood by the skilled person in the art.

Similarly, in some embodiments, each candidate path is represented by a function describing the geometrical extension/representation of the corresponding candidate path. Accordingly, the step of determining a level of convergence between two candidate paths may be based on an area (A) between the two curves defined by the two functions of the candidate paths, i.e.

$$A = \int_0^k f_1(y) - f_2(y) dy.$$

The level of convergence may accordingly depend on the size of the area (A) so that a smaller area value indicates a higher level of convergence as compared to a higher area value.

Moreover, even though the above examples focus on spatial or geometrical extension/representations, the level of convergence between two paths may also depend on other factors such as e.g., a speed profile of the candidate paths, an acceleration profile of the candidate paths, and/or a jerk profile of the candidate paths.

As exemplified above, several different methodologies may be employed to determine a level of convergence between two candidate paths may be implemented alone or in combination with each other. If different methods are combined, one may apply a weighted sum of the independently calculated levels of convergence to determine the "final" or "total" level of convergence between two candidate paths.

Further, in an instance where the obtained candidate paths fulfil the one or more convergence criteria (or in response to the obtained candidate paths fulfilling the one or more convergence criteria), the method S100 comprises selecting S103 one of the obtained candidate paths and controlling the vehicle so to execute the selected candidate path, and evaluating S104 each of the plurality of path planning modules based on the executed candidate path. The selection S103 of one of the obtained candidate paths to be executed by the ADS may for example be a random selection. The step of controlling the vehicle so to execute the selected candidate path may comprise transmitting a signal to a control system of the vehicle (e.g. a control module of the ADS). The control system (or control module of the ADS) is accordingly configured to control one or more actuators (e.g. causing a response in acceleration, braking and/or steering) of the vehicle so to allow the vehicle to execute the selected candidate path.

In some embodiments, the evaluation S104 of the path planning module is performed in view of one or more quality constraints, such as e.g. jerk, acceleration, distance to lane center, and so forth. In more detail, the path planning modules may be evaluated by comparing measured (or otherwise derived) values of jerk, acceleration, distance to lane center, adherence to selected path, etc. while executing the candidate path against corresponding thresholds or desirable ranges. The comparison may be used to calculate a type of "quality score" achieved by the path planning modules based on the measured values of jerk, acceleration, distance to lane center, etc. in view of the corresponding thresholds or desirable ranges.

Additionally or alternatively, the evaluation S104 of the path planning modules may for example be performed in view of one or more safety constraints, such as, e.g. based on obtained threat measures (may also be referred to as criticality metrics) such as Time to Collision (TTC), Post Encroachment Time (PET), distance to external objects, distance to lane/road boundary, and so forth. The threat measures are preferably related to a time period while the selected candidate path was being executed. In other words, the threat measures are derived or otherwise obtained based on sensor data generated during the time period while the selected candidate path was being executed.

Accordingly, the path planning modules may be evaluated by comparing determined (or otherwise obtained) values of Time to Collision (TTC), Post Encroachment Time (PET), distance to external objects, distance to lane/road boundary, and so forth, while executing the candidate path, against corresponding thresholds or corresponding desirable ranges. The comparison may be used to calculate a type of "safety score" achieved by the path planning modules based on the measured values of Time to Collision (TTC), Post Encroachment Time (PET), distance to external objects, distance to lane/road boundary, or any other threat measure in view of the corresponding thresholds or desirable ranges. The "safety score" and "quality score" may then be used as a basis to derive an overall "performance score" by e.g. assigning suitable weights on the parameters included in the respective "score". The weights may for example be set based on predefined metric priorities that are provided in a specification associated with the evaluated path planning module. The derived safety score, quality score, and/or performance score (or an aggregated average value thereof) associated with each path-planning module may for example be used as a basis to decide whether or not the path-planning module is allowed to be further used in the vehicles or if it needs to be updated. In more detail, the as long as the derived safety score, quality score, and/or performance score stays above a corresponding threshold value the associated path planning module may be considered to be functional and testing/validation can continue. Then, once a path planning module has been exposed to a sufficient amount of scenarios, while maintaining safety score, quality score, and/or performance score above a corresponding threshold, the validation need can be considered to be met for that path planning module and it can released as an unsupervised feature to the end-consumers.

Moving on, in an instance where the obtained candidate paths do not fulfil the one or more convergence criteria (or in response to the obtained candidate paths not fulfilling the one or more convergence criteria), the method S100 further comprises determining S105 an exposure need of each path planning module in view of a predicted scene or scenario in the surrounding environment of the vehicle that the vehicle is expected to be exposed to while executing any one of the obtained candidate paths.

The determination of the "exposure need" of a path planning module may be understood as comparison or evaluation of a "validation heat map" in view of the upcoming scene or scenario that the vehicle is expected to be exposed to while executing any one of the obtained candidate paths. The "validation heat map" defines the coverage of the validation data available for each path planning module. In more detail, the "validation heat map" can be constructed from the validation data previously collected using the specific path planning module together with the predefined specification and intended operational design domain (ODD) of the specific path planning module. The "predicted scene or scenario" (may al so be referred to as predicted conditions), could make use of any type of relevant models or metrics, as readily understood by the person skilled in the art, including the planned route, what road conditions will be traversed as well as the predicted weather and traffic conditions.

An Operational design domain (ODD) is to be understood as a description of the operating domains in which an automated or a semi-automated driving system (i.e. AD or ADAS) is designed to function, including, but not limited to, geographic, roadway (e.g. type, surface, geometry, edges and markings), environmental parameters, connectivity, surrounding objects, and speed limitations. That is, the path planning module may be associated with a specific environmental scenario and only configured to operate within an environment fulfilling a set of scenario parameters, example scenarios are traffic jams, highway/expressway cruising, etc. The ODD may further define an allowable exposure rate to driving scenarios and their dynamics (e.g. traffic lights, intersections, jaywalkers, snow, ice, cut-ins, large animals, etc.). The scenario parameters may for example be obtained from sensor data from one or more vehicle-mounted sensors or communication data obtained from a remote server, or another vehicle via a Vehicle-to-Vehicle (V2V) communication protocol. The scenario parameters may for example be type of road, weather data, speed limitations, traffic density, number of available lanes, presence of road work, and so forth.

The "predicted scene or scenario" may accordingly be derived using suitable vision algorithms trained to classify contents or objects in sensor data (such as e.g. image data), using map data, weather forecasts, and so forth, in combination with any suitable algorithm or model configured to output a prediction of the conditions that the vehicle is expected to be exposed to while executing any one of the obtained candidate paths. The conditions, in the predicted scene or scenario, may for example include one or more of snowy conditions, rainy conditions, night-time driving, dense traffic driving, highway driving, traffic jam driving, and so forth.

In accordance with a non-limiting example, if a path planning module is specified to be operable during rainy conditions, and the validation data previously collected while using the path planning module contains little-to-no uses in rainy conditions. Then, if the predicted conditions are "rainy conditions", the "exposure need" in view of the predicted scene or scenario is high for that path planning module (at least in comparison with, for example, a different path planning module that is not specified or does not have an intended ODD covering rainy conditions). Similarly, if a path planning module is specified for traffic jams, and the predicted conditions are "traffic jam conditions", then the exposure need is higher for a path planning module having an ODD covering traffic jams, than for a path planning module whose ODD only includes high-speed highway driving.

Further, in the instance where the obtained candidate paths do not fulfil the one or more convergence criteria, the method S100 comprises selecting S106 one candidate path based on the determined exposure need and the determined level of convergence and controlling the vehicle so to execute the selected candidate path. As before, the step of controlling the vehicle so to execute the selected candidate path may comprise transmitting a signal to a control system of the vehicle (or control module of the ADS). The control system (or control module of the ADS) is accordingly configured to control one or more actuators (e.g. causing a response in acceleration, braking and/or steering) of the vehicle so to allow the vehicle to execute the selected candidate path.

Then, in the instance where the obtained candidate paths do not fulfil the one or more convergence criteria, the method S100 comprises evaluating S107 the path planning module that generate the selected S106 candidate path based on the executed candidate path. As before, the evaluation S107 may be performed so to assign a "safety score" and/or a "quality score" to the evaluated S107 candidate path. The "safety score" and "quality score" may then be used as a basis to derive an overall "performance score" by e.g. assigning suitable weights on the parameters included in the respective "score".

Moreover, in some embodiments, in the instance where the obtained candidate paths do not fulfil the one or more convergence criteria, the candidate path is selected S106 further based on a predefined development priority of each path planning module. In other words, the arbitration algorithm for selecting the most suitable path planning module may further take development priority into account. In more detail, and reverting back to the previous example, where a path planning module is specified to be operable during rainy conditions, and the validation data previously collected while using the path planning module contains little-to-no uses in rainy conditions. In another non-limiting example, there may be an additional path planning module specified to be operable during rainy conditions, and the validation data previously collected while using the additional path planning module also contains little-to-no uses in rainy conditions. Alternatively, the development priority may be predefined for each path planning module based on market need, or criticality of update. In such a case, the development priority may be used to further optimize the selection between the two path planning modules.

However, in some situations clusters of candidate paths may be formed when determining S102 the fulfilment of the one or more convergence criteria. More specifically, the clusters may have intra-convergence but inter-divergence. FIG. 2 illustrates a flowchart representation of a method S100 for closed-loop evaluation of path planning modules for a vehicle equipped with an ADS, where clusters of converged paths are taken into account for obtaining a more optimized decision for closed-loop evaluation of the path planning modules, in accordance with some embodiments.

Thus, in some embodiments, in the instance where the obtained candidate paths do not fulfil the one or more convergence criteria, the selection S106 of one candidate path comprises forming S111 a plurality of clusters of candidate paths based on the determined level of convergence. Each cluster comprises a subset of candidate paths generated by a subset of path planning modules, wherein the candidate paths within a cluster fulfil the convergence criteria within that cluster of candidate paths. Then, one cluster of the plurality is selected S112 based on the determined exposure need, and one candidate path from the selected S112 is selected S113 and the vehicle is controlled so to execute the selected candidate path of the selected cluster. Accordingly, the method S100 then comprises evaluating S114 each path planning module associated with the selected cluster based on the executed candidate path.

Moreover, in some embodiments, the method S100 further comprises predicting a risk for divergence between the candidate paths within each cluster based on the predicted scene or scenario in the surrounding environment of the vehicle that the vehicle is expected to be exposed to while executing the candidate paths in the cluster of candidate paths. Accordingly, the selection S112 of one cluster may be further based on the predicted risk of divergence. The predicted risk for divergence may for example be derived from the predicted scene or scenario, which may contain a prediction of how the predicted scene or scenario evolves over time, for example with regards to modelled/expected behaviours of other road users.

Figure 3:
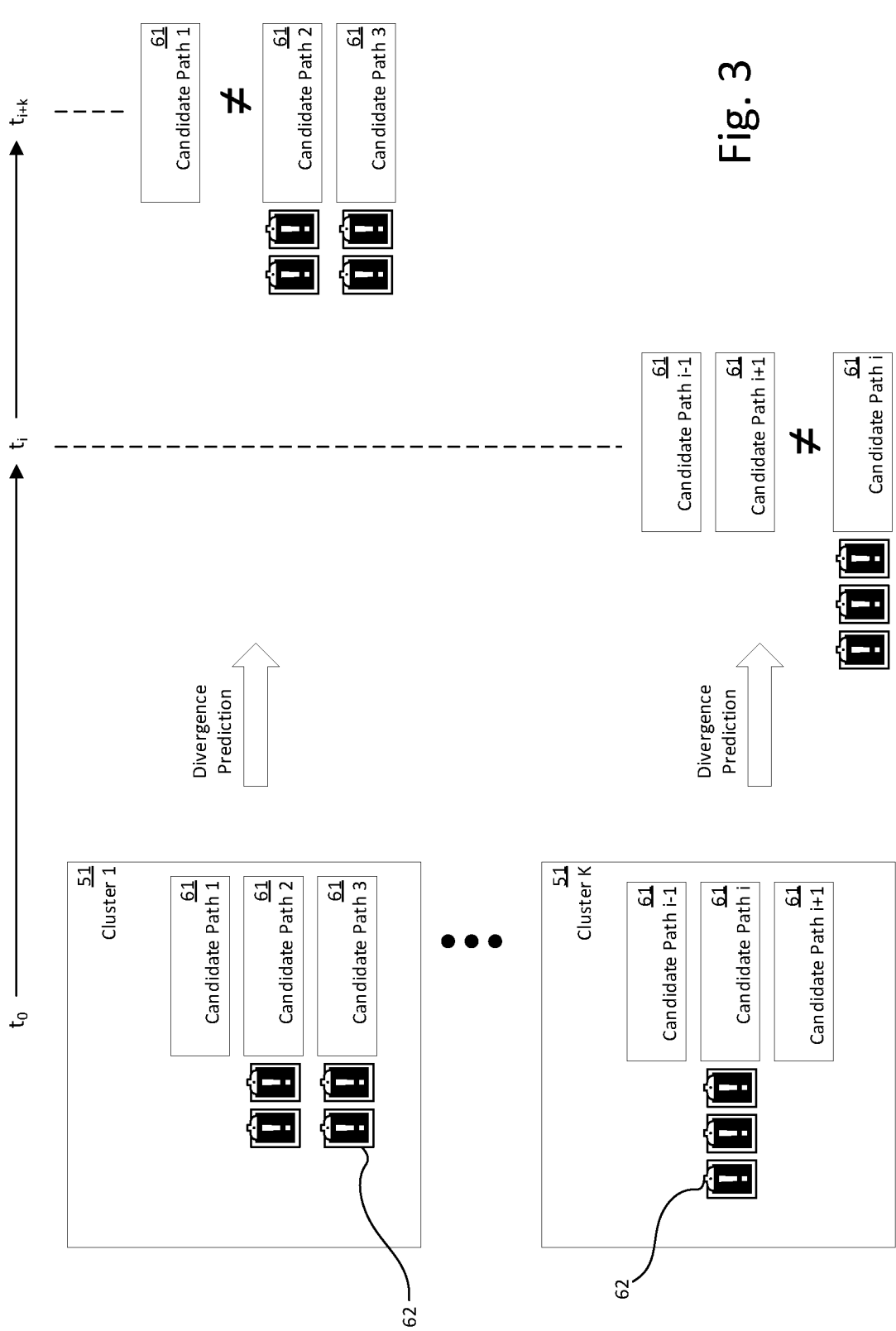
FIG. 3 is a schematic illustration of a selection process including clusters of candidate paths in accordance with some embodiments.

Turning to FIG. 3, which is a schematic illustration of a selection process including clusters 51 of candidate paths 61 in accordance with some embodiments. As illustrated in FIG. 3, an arbitrary number of clusters may be formed S111, however, for the purpose of the following detailed example only the two highlighted clusters 51 (Cluster 1 and Cluster K) are referenced.

In the depicted example of FIG. 3, the two clusters 51 have intra-convergence but inter-divergence at time $t_0$. Cluster K contains a candidate path "i" generated by a path planning module associated with the highest development priority and/or exposure need as indicated by the three icons 62 in FIG. 3. Thus, in the depicted example, candidate path "i" is associated with the "highest priority", slightly above candidate paths 2 and 3.

However, the predicted risk of divergence indicates that the cluster 51 of the highest priority candidate path (candidate path "i"), i.e. Cluster K, diverges earlier than Cluster 1, which contains two candidate paths with a slightly lower priority. There is accordingly more information to be obtained, from a validation perspective, from running Cluster 1, even though candidate path "i" is not contained in that cluster 51. Therefore, by taking a predicted risk of divergence into account when making the selection of cluster, and subsequently the selection of which candidate path to execute, a better optimization with regards to closed-loop evaluation of path planning modules may be obtained.

Executable instructions for performing these functions are, optionally, included in a non-transitory computer-readable storage medium or other computer program product configured for execution by one or more processors.

Figure 4:
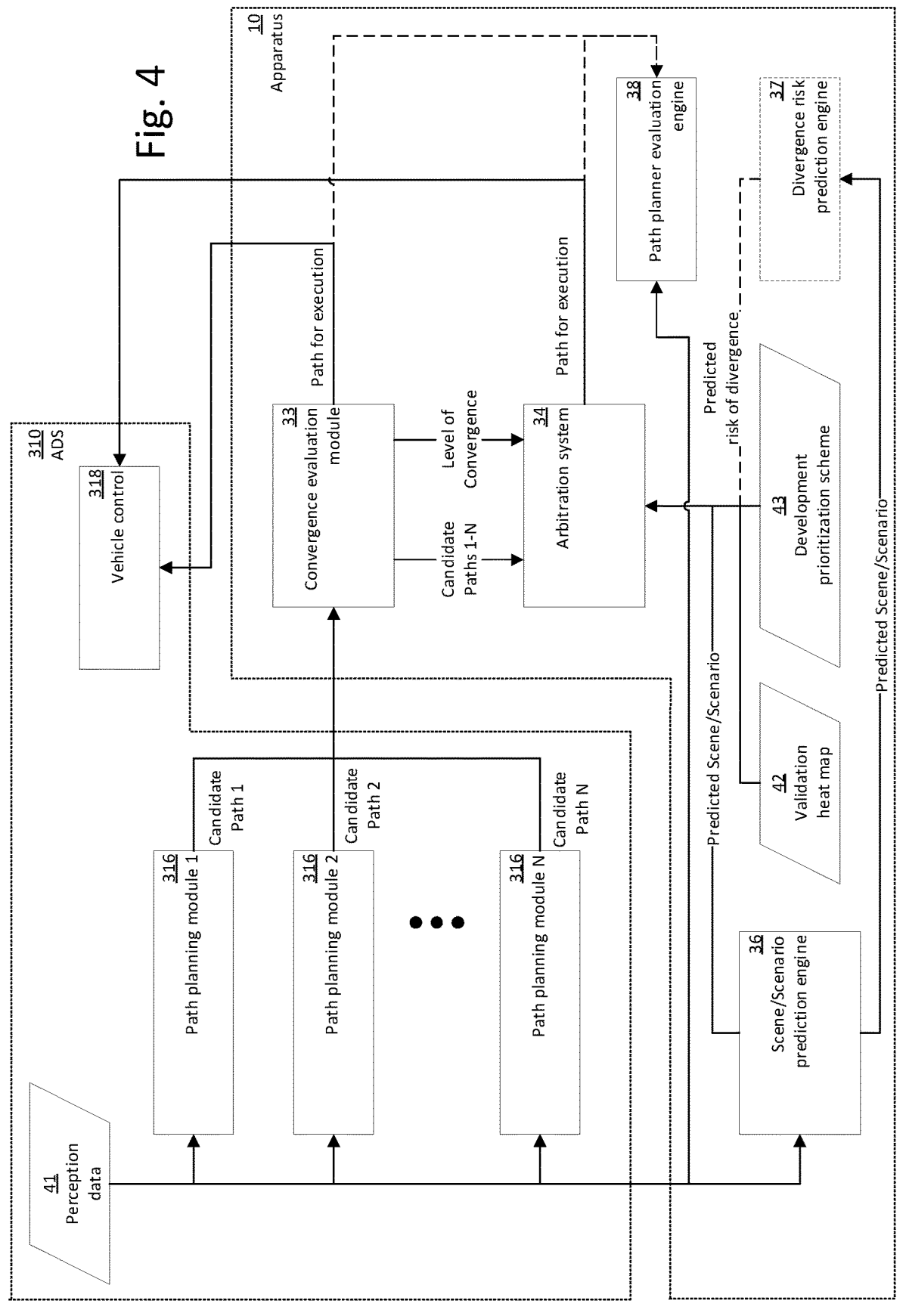
FIG. 4 is a schematic block diagram representation of an apparatus for closed-loop evaluation of path planning modules for a vehicle equipped with an Automated Driving System (ADS) in accordance with some embodiments.
Figure 5:
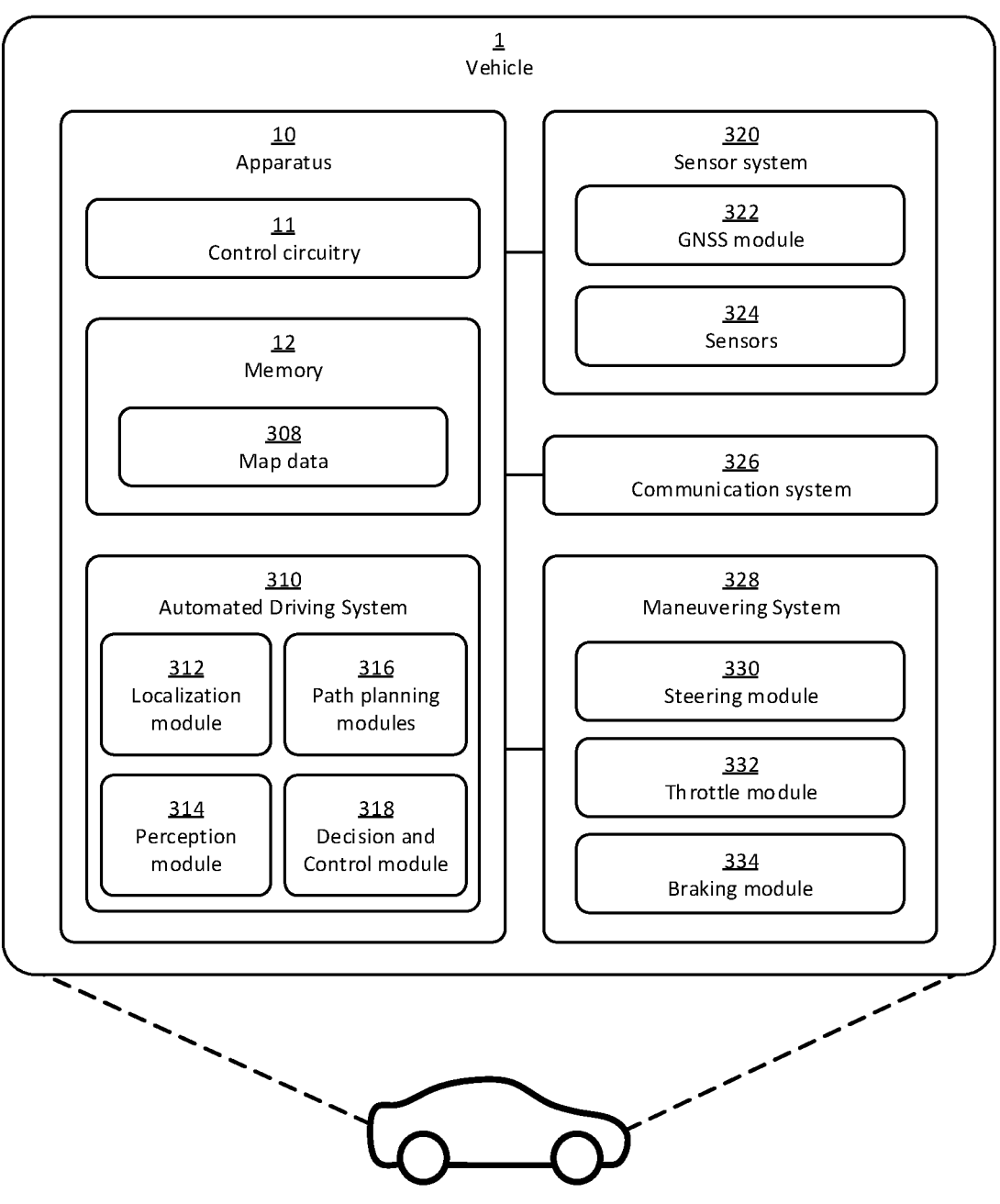
FIG. 5 is a schematic illustration of a vehicle comprising an apparatus for closed-loop evaluation of path planning modules and an Automated Driving System (ADS) in accordance with some embodiments.

FIG. 4 is a schematic block diagram representation of an apparatus 10 for closed-loop evaluation of path planning modules 316 for a vehicle 1 equipped with an Automated Driving System (ADS) 310 in accordance with some embodiments. FIG. 5 is a schematic illustration of an ADS-equipped vehicle 1 comprising such an apparatus 10. As used herein, a "vehicle" is any form of motorized transport. For example, the vehicle 1 may be any road vehicle such as a car (as illustrated herein), a motorcycle, a (cargo) truck, a bus, etc.

In general, FIG. 4 serves to further elucidate the above-described embodiments related to the arbitration decision process for closed-loop evaluation of path planning modules 316 by schematically illustrating the flow of information and the various process steps. The apparatus 10 comprises control circuitry 11 (e.g. one or more processors) configured to perform the functions of the methods disclosed herein, where the functions may be included in a non-transitory computer-readable storage medium 12 or other computer program product configured for execution by the control circuitry 11. Stated differently, the control circuitry 11 of the apparatus may be configured to execute the instructions stored in a computer-readable storage medium to perform the method discussed in reference to FIGS. 2 and 3 in the foregoing. However, in order to better elucidate the present invention, the control circuitry 11 is represented as various software/hardware "modules" or "engines" 33-34, 36-38 and 42-43 in FIG. 4, each of them linked to one or more specific functions of the control circuitry 11.

The apparatus 10 comprises control circuitry 11 and a memory 12. The control circuitry 11 may physically comprise one single circuitry device. Alternatively, the control circuitry 11 may be distributed over several circuitry devices. As an example, the apparatus 10 may share its control circuitry 11 with other parts of the vehicle 1 (e.g. the ADS 310). The control circuitry 11 may comprise one or more processors, such as a central processing unit (CPU), microcontroller, or microprocessor. The one or more processors may be configured to execute program code stored in the memory 12, in order to carry out various functions and operations of the vehicle 1 in addition to the methods disclosed herein. The processor(s) may be or include any number of hardware components for conducting data or signal processing or for executing computer code stored in the memory 12. The memory 12 optionally includes high-speed random access memory, such as DRAM, SRAM, DDR RAM, or other random access solid-state memory devices; and optionally includes non-volatile memory, such as one or more magnetic disk storage devices, optical disk storage devices, flash memory devices, or other non-volatile solid-state storage devices. The memory 12 may include database components, object code components, script components, or any other type of information structure for supporting the various activities of the present description.

In the illustrated example, the memory 12 further stores map data 308. The map data 308 may for instance be used by the ADS 310 of the vehicle 1 in order to perform autonomous functions of the vehicle 1. The map data 308 may comprise high-definition (HD) map data. It is contemplated that the memory 12, even though illustrated as a separate element from the ADS 310, may be provided as an integral element of the ADS 310. In other words, according to an exemplary embodiment, any distributed or local memory device may be utilized in the realization of the present inventive concept. Similarly, the control circuitry 11 may be distributed e.g. such that one or more processors of the control circuitry 11 is provided as integral elements of the ADS 310 or any other system of the vehicle 1. In other words, according to an exemplary embodiment, any distributed or local control circuitry device may be utilized in the realization of the present inventive concept. The ADS 310 is configured carry out the functions and operations of the autonomous or semi-autonomous functions of the vehicle 1. The ADS 310 can comprise a number of modules, where each module is tasked with different functions of the ADS 310.

The vehicle 1 comprises a number of elements which can be commonly found in autonomous or semi-autonomous vehicles. It will be understood that the vehicle 1 can have any combination of the various elements shown in FIG. 5. Moreover, the vehicle 1 may comprise further elements than those shown in FIG. 5. While the various elements is herein shown as located inside the vehicle 1, one or more of the elements can be located externally to the vehicle 1. Further, even though the various elements are herein depicted in a certain arrangement, the various elements may also be implemented in different arrangements, as readily understood by the skilled person. It should be further noted that the various elements may be communicatively connected to each other in any suitable way. The vehicle 1 of FIG. 5 should be seen merely as an illustrative example, as the elements of the vehicle 1 can be realized in several different ways.

The vehicle 1 further comprises a sensor system 320. The sensor system 320 is configured to acquire sensory data about the vehicle itself, or of its surroundings. The sensor system 320 may for example comprise a Global Navigation Satellite System (GNSS) module 322 (such as a GPS) configured to collect geographical position data of the vehicle 1. The sensor system 320 may further comprise one or more sensors 324. The sensor(s) 324 may be any type of on-board sensors, such as cameras, LIDARs and RADARs, ultrasonic sensors, gyroscopes, accelerometers, odometers etc. It should be appreciated that the sensor system 320 may also provide the possibility to acquire sensory data directly or via dedicated sensor control circuitry in the vehicle 1.

The vehicle 1 further comprises a communication system 326. The communication system 326 is configured to communicate with external units, such as other vehicles (i.e. via vehicle-to-vehicle (V2V) communication protocols), remote servers (e.g. cloud servers), databases or other external devices, i.e. vehicle-to-infrastructure (V2I) or vehicle-to-everything (V2X) communication protocols. The communication system 318 may communicate using one or more communication technologies. The communication system 318 may comprise one or more antennas. Cellular communication technologies may be used for long range communication such as to remote servers or cloud computing systems. In addition, if the cellular communication technology used have low latency, it may also be used for V2V, V2I or V2X communication. Examples of cellular radio technologies are GSM, GPRS, EDGE, LTE, 5G, 5G NR, and so on, also including future cellular solutions. However, in some solutions mid to short range communication technologies may be used such as Wireless Local Area (LAN), e.g. IEEE 802.11 based solutions, for communicating with other vehicles in the vicinity of the vehicle 1 or with local infrastructure elements. ETSI is working on cellular standards for vehicle communication and for instance 5G is considered as a suitable solution due to the low latency and efficient handling of high bandwidths and communication channels.

The communication system 326 may further provide the possibility to send output to a remote location (e.g. remote operator or control center) by means of the one or more antennas. Moreover, the communication system 326 may be further configured to allow the various elements of the vehicle 1 to communicate with each other. As an example, the communication system may provide a local network setup, such as CAN bus, I2C, Ethernet, optical fibers, and so on. Local communication within the vehicle may also be of a wireless type with protocols such as WiFi, LoRa, Zigbee, Bluetooth, or similar mid/short range technologies.

The vehicle 1 further comprises a maneuvering system 320. The maneuvering system 328 is configured to control the maneuvering of the vehicle 1. The maneuvering system 328 comprises a steering module 330 configured to control the heading of the vehicle 1. The maneuvering system 328 further comprises a throttle module 332 configured to control actuation of the throttle of the vehicle 1. The maneuvering system 328 further comprises a braking module 334 configured to control actuation of the brakes of the vehicle 1. The various modules of the maneuvering system 328 may also receive manual input from a driver of the vehicle 1 (i.e. from a steering wheel, a gas pedal and a brake pedal respectively). However, the maneuvering system 328 may be communicatively connected to the ADS 310 of the vehicle, to receive instructions on how the various modules of the maneuvering system 328 should act. Thus, the ADS 310 can control the maneuvering of the vehicle 1, for example via the decision and control module 318.

The ADS 310 may comprise a localization module 312 or localization block/system. The localization module 312 is configured to determine and/or monitor a geographical position and heading of the vehicle 1, and may utilize data from the sensor system 320, such as data from the GNSS module 322. Alternatively, or in combination, the localization module 312 may utilize data from the one or more sensors 324. The localization system may alternatively be realized as a Real Time Kinematics (RTK) GPS in order to improve accuracy.

The ADS 310 may further comprise a perception module 314 or perception block/system 314. The perception module 314 may refer to any commonly known module and/or functionality, e.g. comprised in one or more electronic control modules and/or nodes of the vehicle 1, adapted and/or configured to interpret sensory data—relevant for driving of the vehicle 1—to identify e.g. obstacles, vehicle lanes, relevant signage, appropriate navigation paths etc. The perception module 314 may thus be adapted to rely on and obtain inputs from multiple data sources, such as automotive imaging, image processing, computer vision, and/or in-car networking, etc., in combination with sensory data e.g. from the sensor system 320.

The localization module 312 and/or the perception module 314 may be communicatively connected to the sensor system 320 in order to receive sensory data from the sensor system 320. The localization module 312 and/or the perception module 314 may further transmit control instructions to the sensor system 320. Details related to the convergence criteria, scene or scenario prediction, exposure need determination, evaluation process, etc. have been discussed in detail in the foregoing, and will for the sake of brevity and conciseness not be repeated in explicit detail again with respect to FIGS. 4 and 5. It is presumed that the person skilled in the art readily understands that the corresponding examples and features discussed in the foregoing are analogously applicable with respect to the apparatus depicted in FIGS. 4 and 5.

Turning to FIG. 4, it should be noted that the ADS 310 is schematically separated from the apparatus 10 for closed-loop evaluation of path planning modules 316 in FIG. 4, which is depicted as a separate unit or device. However, as readily understood by the skilled reader, the apparatus 10 may be an integrated part of the ADS 310. As mentioned, the ADS 310 may comprise further functions or functional than those depicted in FIG. 4, such as e.g. various perception or computer vision functions (e.g. lane tracing functions, object detection functions, etc.) 314, decision and control functions 318, and various other autonomous or semi-autonomous functions (e.g. lane keeping assist, traffic jam pilots, highway pilots, adaptive cruise control, emergency brake assistance, collision avoidance functions, etc.), some of which are schematically depicted in FIG. 5. However, in order to avoid cluttering and for the purpose of clarity in the drawings, only the path planning modules/functions 316 and the generated perception data (e.g. processed sensor data as output by one or more perception/vision functions 314 of the ADS) are depicted.

The apparatus 10 comprises control circuitry (see e.g. ref. 11 in FIG. 5) configured to obtain a candidate path from each of a plurality of path planning modules 316 of the ADS 310. In general, each path planning module 316 is configured to generate candidate paths to be executed by the ADS 310 of the vehicle 1. The path planning modules 316 may for example receive perception data 41 as input, where the perception data 41 may comprise traced road geometries in the surrounding area of the vehicle 1, detected and classified objects in the surrounding area of the vehicle 1, and so forth, in order to output candidate paths to be executed by the vehicle 1 (or the decision and control function 318 of the ADS) by controlling the acceleration, braking and steering actuators of the vehicle 1. The path planning modules 316 may further receive map data 308 (e.g. HD map data) and navigation data (e.g. goal/target destination) as input for generating the candidate paths.

Further, the control circuitry 11 is configured to determine, e.g. by means of a convergence evaluation module 33, a fulfilment of the one or more convergence criteria by the obtained candidate paths by comparing the obtained candidate paths with each other and determining a level of convergence between the candidate paths. As mentioned, the one or more convergence criteria comprises a criterion that all of the obtained candidate paths converge within an error margin.

Then, in an instance where the obtained candidate paths fulfil the one or more convergence criteria, the control circuitry 11 is configured to select one of the obtained candidate paths and controlling the vehicle 1 so to execute the selected candidate path, and to evaluate each of the plurality of path planning modules 316 based on the executed candidate path. In the instance where the obtained candidate paths fulfil the one or more convergence criteria, the convergence evaluation module 33 may be configured to randomly output one of the obtained candidate paths to a vehicle control 35 module for execution. The evaluation of the path planning modules 316 may for example be performed by a path planner evaluation engine 38 that receives various performance parameters (e.g. lateral/longitudinal acceleration measurements, threat measures (e.g. TTC, PET, etc.), distance to objects, distance to lane/road boundary, distance to lane center, etc.), and optionally the selected and executed candidate path, as input. The performance parameters are suitably collected/generated during a time period while the selected path is being executed. The path planner evaluation engine 38 may then be configured to compare the received performance parameters with (predefined) threshold ranges or threshold values to derive a performance score for the path planning modules 316 (c.f. safety score, quality score and performance score discussed in the foregoing).

However, in an instance where the obtained candidate paths do not fulfil the one or more convergence criteria, the control circuitry 11 is configured to determine an exposure need 42 of each path planning module 316 in view of a predicted scene or scenario in the surrounding environment of the vehicle that the vehicle is expected to be exposed to while executing any one of the obtained candidate paths. Then, the control circuitry 11 is configured to select one candidate path based on the determined exposure need 42 and the determined level of convergence and controlling the vehicle 1 so to execute the selected candidate path, and to evaluate the path planning module that generated the selected candidate path planning modules based on the executed candidate path.

Accordingly, if the convergence evaluation module 33 concludes that one or more of the obtained candidate paths do not fulfil the one or more convergence criteria in view of the other of the obtained candidate paths, the obtained candidate paths together with a level of convergence between the candidate paths is sent to an arbitration system 34. The arbitration system 34 is configured to receive the predicted scene or scenario and a "validation heat map" 42 as input in order to determine an exposure need of each path planning module 316 in view of a predicted scene or scenario.

Then, based on the determined exposure need, and the determined level of convergence, the arbitration system 34 selects one candidate path to be executed by the vehicle 1. The selected candidate path may for example be transmitted to a decision and control module 318 of the ADS, where the decision and control module 318 is configured to control one or more actuators of the vehicle 1 so to execute the selected candidate path. For example, the decision and control module 318 may execute the selected candidate path by transmitting one or more signals to the maneuvering system 328 of the vehicle 1. The arbitration system 34 may be further configured to select one candidate path for execution by the vehicle based on a predefined development priority 43 of each path planning module 316.

Just as before, the evaluation may for example be performed by a path planner evaluation engine 38 that receives various performance parameters (e.g. lateral/longitudinal acceleration measurements, threat measures (e.g. TTC, PET, etc.), distance to objects, distance to lane/road boundary, distance to lane center, etc.), and optionally, the selected and executed candidate path as input. The performance parameters are suitably collected/generated during a time period while the selected path is being executed. The path planner evaluation engine 38 may then be configured to compare the received performance parameters with (predefined) threshold ranges or threshold values to derive a performance score for the path planning module 316 that generated the selected and executed candidate path.

Moreover, in some embodiments, the control circuitry is configured to update the validation heat map 42 after every loop (i.e. after every execution of a selected candidate path) for the evaluated path planning modules 316. The "validation heat map" may, as mentioned, be constructed from validation data previously collected using the specific path planning module together with the predefined specification and intended operational design domain (ODD) of the specific path planning module. Thus, the "validation heat map" is specific for each individual path planning module 316 and indicates a progress of the validation effort for each individual path planning module. In other words, the "validation heat map" indicates how much exposure a path planning module 316 has had to specific conditions in view of the validation requirements for the path planning module.

Further, in some embodiments, in the instance where the obtained candidate paths do not fulfil the one or more convergence criteria, the control circuitry 11 may be further configured to form a plurality of clusters 51 of candidate paths 61 based on the determined level of convergence. Each cluster 51 comprising a subset of candidate paths generated by a corresponding subset of path planning modules 316, where the candidate paths within a cluster fulfil the convergence criteria within that cluster of candidate paths. Then, the control circuitry 11 is configured to select one cluster 51 of the plurality of clusters based on the determined exposure need, and select one candidate path from the selected cluster and controlling the vehicle so to execute the selected candidate path of the selected cluster. Accordingly, the evaluation process may comprise evaluate each path planning module 316 associated with the selected cluster based on the executed candidate path.

Moreover, the control circuitry 11 may be further configured to predict a risk for divergence between the candidate paths within each cluster 51 based on the predicted scene or scenario in the surrounding environment of the vehicle that the vehicle 1 is expected to be exposed to while executing each of the candidate paths in the cluster of candidate paths. Accordingly, the selection of one cluster may be further based on the predicted risk of divergence within each cluster.

In other words, the apparatus 10 may further comprise a divergence risk prediction engine 37 that is configured to predict a risk of divergence between the candidate paths in each cluster and to provide this as input to the arbitration system 34. The arbitration system 34 may then use the risk of divergence as further input in the selection of a cluster and subsequent selection of a candidate path for execution.

The present invention has been presented above with reference to specific embodiments. However, other embodiments than the above described are possible and within the scope of the invention. Different method steps than those described above, performing the method by hardware or software, may be provided within the scope of the invention. Thus, according to an exemplary embodiment, there is provided a non-transitory computer-readable storage medium storing one or more programs configured to be executed by one or more processors of a vehicle control system, the one or more programs comprising instructions for performing the method according to any one of the above-discussed embodiments. Alternatively, according to another exemplary embodiment a cloud computing system can be configured to perform any of the methods presented herein. The cloud computing system may comprise distributed cloud computing resources that jointly perform the methods presented herein under control of one or more computer program products.

Generally speaking, a computer-accessible medium may include any tangible or non-transitory storage media or memory media such as electronic, magnetic, or optical media—e.g., disk or CD/DVD-ROM coupled to computer system via bus. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

The processor(s) 11 (associated with the apparatus 10) may be or include any number of hardware components for conducting data or signal processing or for executing computer code stored in memory 12. The device 10 has an associated memory 12, and the memory 12 may be one or more devices for storing data and/or computer code for completing or facilitating the various methods described in the present description. The memory may include volatile memory or non-volatile memory. The memory 12 may include database components, object code components, script components, or any other type of information structure for supporting the various activities of the present description. According to an exemplary embodiment, any distributed or local memory device may be utilized with the systems and methods of this description. According to an exemplary embodiment the memory 12 is communicably connected to the processor 11 (e.g., via a circuit or any other wired, wireless, or network connection) and includes computer code for executing one or more processes described herein.

Accordingly, it should be understood that parts of the described solution may be implemented either in the vehicle, in a system located external the vehicle, or in a combination of internal and external the vehicle; for instance in a server in communication with the vehicle, a so called cloud solution. For instance, sensor data may be sent to an external system and that system performs the steps to evaluate the path planning modules. The different features and steps of the embodiments may be combined in other combinations than those described.

It should be noted that any reference signs do not limit the scope of the claims, that the invention may be at least in part implemented by means of both hardware and software, and that several "means" or "units" may be represented by the same item of hardware.

Although the figures may show a specific order of method steps, the order of the steps may differ from what is depicted. In addition, two or more steps may be performed concurrently or with partial concurrence. Such variation will depend on the software and hardware systems chosen and on designer choice. All such variations are within the scope of the invention. Likewise, software implementations could be accomplished with standard programming techniques with rule-based logic and other logic to accomplish the various obtaining steps, determining steps, selecting steps and evaluating steps. The above mentioned and described embodiments are only given as examples and should not be limiting to the present invention. Other solutions, uses, objectives, and functions within the scope of the invention as claimed in the below described patent claims should be apparent for the person skilled in the art.

The invention claimed is:

1. A computer-implemented method for closed-loop evaluation of path planning modules for a vehicle equipped with an Automated Driving System (ADS), the method comprising:

obtaining a candidate path from each of a plurality of path planning modules of the ADS, wherein each path planning module is configured to generate candidate paths to be executed by the ADS of the vehicle;

determining a fulfilment of one or more convergence criteria by the obtained candidate paths by comparing the obtained candidate paths with each other and determining a level of convergence between the candidate paths;

in an instance where the obtained candidate paths fulfil the one or more convergence criteria:

selecting one of the obtained candidate paths and controlling the vehicle so to execute the selected candidate path;

evaluating each of the plurality of path planning modules based on the executed candidate path;

in an instance where the obtained candidate paths do not fulfil the one or more convergence criteria:

determining an exposure need of each path planning module in view of a predicted scene or scenario in the surrounding environment of the vehicle that the vehicle is expected to be exposed to while executing any one of the obtained candidate paths;

selecting one candidate path based on the determined exposure need and the determined level of convergence and controlling the vehicle so to execute the selected candidate path; and evaluating the path planning module that generated the selected candidate path based on the executed candidate path.

2. The method according to claim 1, wherein the one or more convergence criteria comprises a criterion that all of the obtained candidate paths converge within an error margin.

3. The method according to claim 1, further comprising:

in the instance where the obtained candidate paths do not fulfil the one or more convergence criteria:

wherein the candidate path is selected further based on a predefined development priority of each path planning module.

4. The method according to claim 1, wherein the exposure need of each path planning module is defined by at least a predefined specification and an intended operational design domain (ODD) of each path planning module.

5. The method according to claim 1, the method further comprising:

in the instance where the obtained candidate paths do not fulfil the one or more convergence criteria:

wherein the selecting one candidate path comprises:

forming a plurality of clusters of candidate paths based on the determined level of convergence, each cluster comprising a subset of candidate paths generated by a subset of path planning modules, wherein the candidate paths within a cluster fulfil the convergence criteria within that cluster of candidate paths, selecting one cluster of the plurality of clusters based on the determined exposure need, and selecting one candidate path from the selected cluster and controlling the vehicle so to execute the selected candidate path of the selected cluster;

wherein the evaluating the path planning module comprises:

evaluating each path planning module associated with the selected cluster based on the executed candidate path.

6. The method according to claim 5, further comprising:

in the instance where the obtained candidate paths do not fulfil the one or more convergence criteria:

predicting a risk for divergence between the candidate paths within each cluster based on the predicted scene or scenario in the surrounding environment of the vehicle that the vehicle is expected to be exposed to while executing the candidate paths in the cluster of candidate paths;

wherein the selection of one cluster is further based on the predicted risk of divergence within each cluster.

7. A non-transitory computer-readable storage medium comprising instructions which, when executed by a computing device, causes the computer to carry out the method according to claim 1.

8. An apparatus for closed-loop evaluation of path planning modules for a vehicle equipped with an Automated Driving System (ADS), the apparatus comprising control circuitry configured to:

obtain a candidate path from each of a plurality of path planning modules of the ADS, wherein each path planning module is configured to generate candidate paths to be executed by the ADS of the vehicle;

determine a fulfilment of the one or more convergence criteria by the obtained candidate paths by comparing the obtained candidate paths with each other and determining a level of convergence between the candidate paths;

in an instance where the obtained candidate paths fulfil the one or more convergence criteria:

select one of the obtained candidate paths and controlling the vehicle so to execute the selected candidate path;

evaluate each of the plurality of path planning modules based on the executed candidate path;

in an instance where the obtained candidate paths do not fulfil the one or more convergence criteria:

determine an exposure need of each path planning module in view of a predicted scene or scenario in the surrounding environment of the vehicle that the vehicle is expected to be exposed to while executing any one of the obtained candidate paths;

select one candidate path based on the determined exposure need and the determined level of convergence and controlling the vehicle so to execute the selected candidate path;

evaluate the path planning module that generated the selected candidate path planning modules based on the executed candidate path.

9. The apparatus according to claim 8, wherein the one or more convergence criteria comprises a criterion that all of the obtained candidate paths converge within an error margin.

10. The apparatus according to claim 8, the control circuitry being further configured to:

in the instance where the obtained candidate paths do not fulfil the one or more convergence criteria:

wherein the candidate path is selected further based on a predefined development priority of each path planning module.

11. The apparatus according to claim 8, wherein the exposure need of each path planning module is defined by at least a predefined specification and an intended operational design domain (ODD) of each path planning module.

12. The apparatus according to claim 8, the control circuitry being further configured to:

in the instance where the obtained candidate paths do not fulfil the one or more convergence criteria:

wherein the selecting one candidate path comprises:

form a plurality of clusters of candidate paths based on the determined level of convergence, each cluster comprising a subset of candidate paths generated by a corresponding subset of path planning modules, wherein the candidate paths within a cluster fulfil the convergence criteria within that cluster of candidate paths, select one cluster of the plurality of clusters based on the determined exposure need, and select one candidate path from the selected cluster and controlling the vehicle so to execute the selected candidate path of the selected cluster;

wherein the evaluating the path planning module comprises:

evaluate each path planning module associated with the selected cluster based on the executed candidate path.

13. The apparatus according to claim 12, wherein the control circuitry is further configured to:

in the instance where the obtained candidate paths do not fulfil the one or more convergence criteria:

predict a risk for divergence between the candidate paths within each cluster based on the predicted scene or scenario in the surrounding environment of the vehicle that the vehicle is expected to be exposed to while executing each of the candidate paths in the cluster of candidate paths; and wherein the selection of one cluster is further based on the predicted risk of divergence within each cluster.

14. A vehicle comprising an apparatus according to claim 8.

* * * * *